Dec. 11, 1951 — R. T. CLOUD — 2,577,875
PENDULUM COMPENSATOR
Filed Dec. 22, 1945 — 3 Sheets-Sheet 1

INVENTOR:
Raymond T. Cloud
BY Goodwin
Attorney

Dec. 11, 1951  R. T. CLOUD  2,577,875
PENDULUM COMPENSATOR
Filed Dec. 22, 1945  3 Sheets-Sheet 3

INVENTOR:
Raymond T. Cloud
BY
Attorney

Patented Dec. 11, 1951

2,577,875

UNITED STATES PATENT OFFICE 2,577,875

PENDULUM COMPENSATOR

Raymond T. Cloud, Tulsa, Okla., assignor to Stanolind Oil and Gas Company, Tulsa, Okla., a corporation of Delaware Application December 22, 1945, Serial No. 636,867

5 Claims. (Cl. 33—220)

This invention pertains to an improvement in the art of elevation meters and more particularly to an improvement in the acceleration or deceleration compensator for a pendulum-type elevation meter such as that described in my Patent U. S. 2,362,616. The apparatus disclosed in that patent has been found to work satisfactorily in most cases, but I have found that in a number of cases, particularly when making level surveys in connection with gravimetric prospecting, the accuracy required cannot always be attained with that type of instrument. In gravimetric surveys the maximum permissible error in elevation is of the order of 0.5 foot per mile or less. Accuracies of this order are obtained even with the level and rod only when extreme precautions are used.

It is, therefore, an object of this invention to provide an improved acceleration compensator for an elevation meter. A further object of this invention is to provide an improved acceleration compensator which will produce a restoring torque to an otherwise free pendulum in a moving elevation meter, which torque is substantially proportional to the cosine of the angle of slope of the path over which a vehicle carrying the elevation meter travels. A still further object of this invention is to provide automatic compensation for a freely suspended pendulum whereby any displacement of the pendulum due to acceleration or deceleration of the vehicle carrying the pendulum is accurately counteracted and the pendulum does not respond to accelerations or decelerations of the vehicle.

This invention in brief, therefore, comprises an apparatus for improving the accuracy of a mechanical elevation meter by applying an external force to the pendulum exactly equal and opposite to the inertia forces acting thereon due to acceleration or deceleration of the pendulum support. More particularly, this restoring torque is varied as the external forces on the pendulum and the direction of these forces are varied whereby the otherwise free pendulum is substantially compensated over a wide range of vehicle path slopes for the tendency of the pendulum to be displaced from the vertical due to acceleration or deceleration of the vehicle carrying the elevation meter. In the description of this invention certain drawings and illustrations, which form a part of this application, will be referred to. In these drawings:

Figure 1:
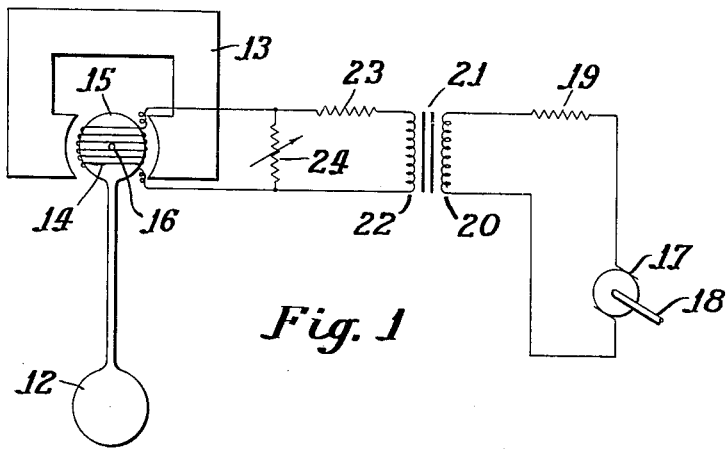
Figure 1 shows a schematic form of one embodiment of the invention described in my above-mentioned Patent U. S. 2,362,616.

In Figure 1 a pendulum 12 is shown rotatably mounted between the poles of a permanent magnet 13. Within the air gap between the poles of the magnet a compensating coil 14 is rigidly attached to the armature 15 and is adapted to exert a torque on the pendulum about its axis 16 which is preferably located in the plane of the mean magnetic field of the magnet 13 whenever a current is passed through the compensating coil, said mean magnetic field being defined by a plane passing through the pole pieces and preferably through the axis of the coil and which divides substantially equally the flux paths between the pole pieces. Inasmuch as the axis 16 of the armature, coil, and pendulum is perpendicular to the direction of motion of the vehicle carrying the pendulum, the pendulum, which is used as a reference for determining the slope of the path of travel, is also affected by the accelerations and decelerations of the vehicle. This compensating coil 14 is therefore connected to a circuit which generates a current that is substantially proportional to the time derivative of the velocity of the vehicle carrying the pendulum. In this circuit a generator 17 is connected by flexible shaft 18 to a wheel of the car or some other means which rotates proportional to the velocity of the car. The output of this generator is passed through a high resistor 19 and the primary coil 20 of a transformer 21. The resistance of this circuit including the generator and the resistor is large compared with the impedance of the primary winding 20 so that the current flowing through this primary winding is substantially proportional to the voltage of the generator and hence is proportional to the speed of the car. Now when there is a change in the primary current flowing in coil 20 caused by a change in speed of the vehicle, the voltage resulting in the secondary coil 22 of transformer 21 is proportional to $di/dt$, where $di$ is the change in current output of generator 17 during any interval of time $dt$. With the resistance across the secondary winding 22 and resistor 23 large, the current flowing in this circuit is substantially proportional to the acceleration of the car. A variable resistance 24 is provided in this circuit in parallel with the compensating coil 14 whereby the magnitude of the current through the coil is adjusted to compensate exactly for changes in acceleration or deceleration of the vehicle. Thus, by passing current into the coil in such a direction that the torque due to the current in the coil opposes the torque due to the vehicle acceleration and by properly adjusting the magnitude of this current, it is possible to cause the pendulum 12 to remain substantially fixed when the vehicle is either accelerated or decelerated, and there is no change in the slope of the path.

Figure 2:
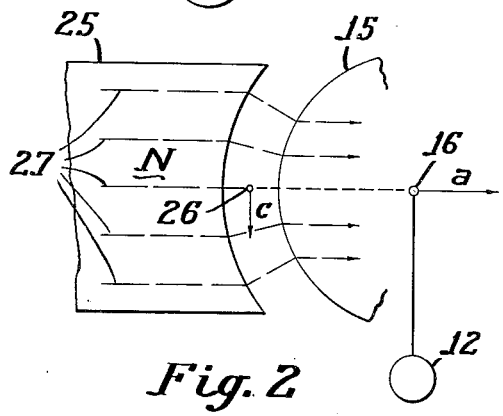
Figure 2 is a diagrammatic representation of the flux path between the magnet and the armature in the apparatus shown diagrammatically in Figure 1 together with a diagram of the forces acting upon the pendulum when the vehicle carrying this elevation meter is accelerated on a substantially level path.

As indicated above, I have found that the above-described apparatus does not in certain instances exactly compensate for the displacement of the pendulum due to acceleration or deceleration of the vehicle. This error has been found to be inherent in the type of construction shown in Figure 1 for the reasons set out below. In Figure 2 one pole 25 of permanent magnet 13 is shown in an enlarged view opposite the pendulum armature 15 with one turn 26 of compensator coil 14 therebetween. The flux path in the pole, the pendulum armature 15, and the space therebetween is represented by the lines 27. It will be noted that all of the flux lines in the space between the pole piece 25 and the pendulum armature 15 are radial. That is, these lines are perpendicular to the respective faces of the pole piece and the armature. Assuming that the axis 16 of the pendulum 12 is accelerated in the direction and in the amount indicated by vector $a$, then due to the electrical circuit connected to the compensator coil 14 as described above a current is induced in the compensator coil which is represented by the mean effective turn 26 thereof. This mean effective turn, which is defined as the theoretical turn located at the center of the cross section of the compensator coil 14, is located preferably in the plane of the mean magnetic field when the vehicle is traveling on a level path. The tangential force exerted, therefore, by turn 26 may be represented by the vector $c$. Inasmuch as turn 26 is associated with armature 15 and with this armature rotates about axis 16, the force exerted by this and all the other turns of coil 14 constitutes the torque that holds pendulum 12 at equilibrium during the assumed acceleration in the case where the vehicle is traveling on a substantially level path.

Figure 3:
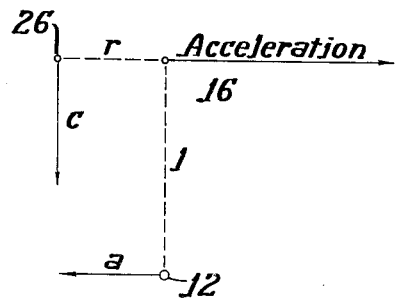
Figure 3 shows a resolution of all the forces acting upon the pendulum involved in the apparatus of Figure 1 in the position and under the conditions shown in Figure 2.

In Figure 3 I have shown a resolution of the forces acting on the pendulum when the vehicle is accelerated horizontally as indicated. The acceleration of the vehicle with reference to the mass of the pendulum 12 tends to produce a torque about the axis 16 equal to $al$, where $a=$inertia forces acting on the pendulum mass tending to maintain the pendulum at rest or at a constant velocity, and $l=$length of pendulum. Assuming that variable resistance 24 is properly adjusted, the current flow through coil 14 tends to produce a torque about axis 16 which will exactly compensate for the torque $al$ due to the acceleration of the vehicle. Expressed mathematically for a condition of equilibrium, $$cr = al \tag{1}$$

where $c=$total force exerted by coil 14, and $r=$effective radius of coil 14.

Figure 4:
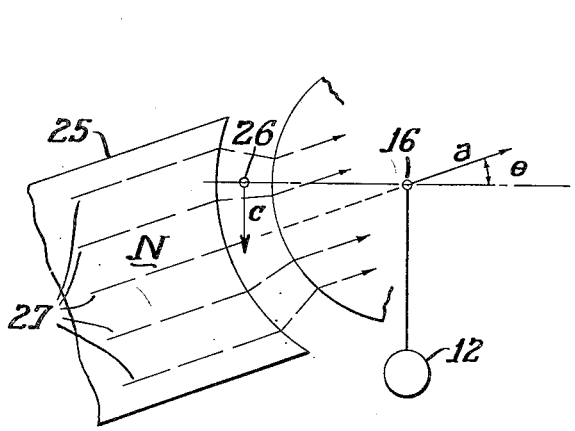
Figure 4 is a diagrammatic representation of the flux path between the magnet and the armature in the apparatus of Figure 1 together with a diagram of the forces acting upon the pendulum when the vehicle carrying this elevation meter is accelerated on an inclined path.

The condition existing in this acceleration compensator when the path over which the vehicle is traveling is at an angle $\theta$ with the horizontal and the vehicle is accelerated is shown diagrammatically in Figure 4. Inasmuch as the flux between the pole piece 25 and the armature 15 is radial as above described, the force $c$ exerted by the mean effective turn 26 is exactly the same and in the same direction as the force exerted by this turn when the path of the vehicle was horizontal as described above.

Figure 5:
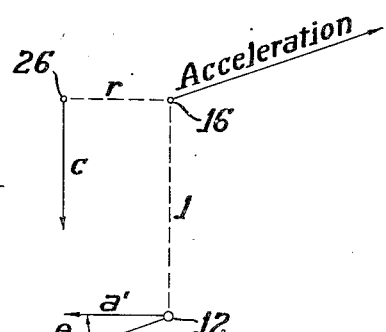
Figure 5 shows a resolution of all the forces acting upon the pendulum involved in the apparatus of Figure 1 in the position and under the conditions shown in Figure 4.

In Figure 5 I have shown a resolution of the forces on the pendulum of the apparatus shown in Figure 1 when the apparatus is in the position shown in Figure 4, i. e., when the vehicle is accelerated at a slope angle $\theta$ to the horizon. Since the flux path in the region of turn 26 is radial as explained above, the compensating torque is again $cr$. In this case, however, the torque produced by the pendulum mass 12 about axis 16 is $$a'l = a \cos \theta \, l \tag{2}$$

Thus, it can be seen that the torque produced by the pendulum on acceleration varies directly as the cosine of the slope angle and the compensation remains unchanged on all slope angles.

Figure 6:
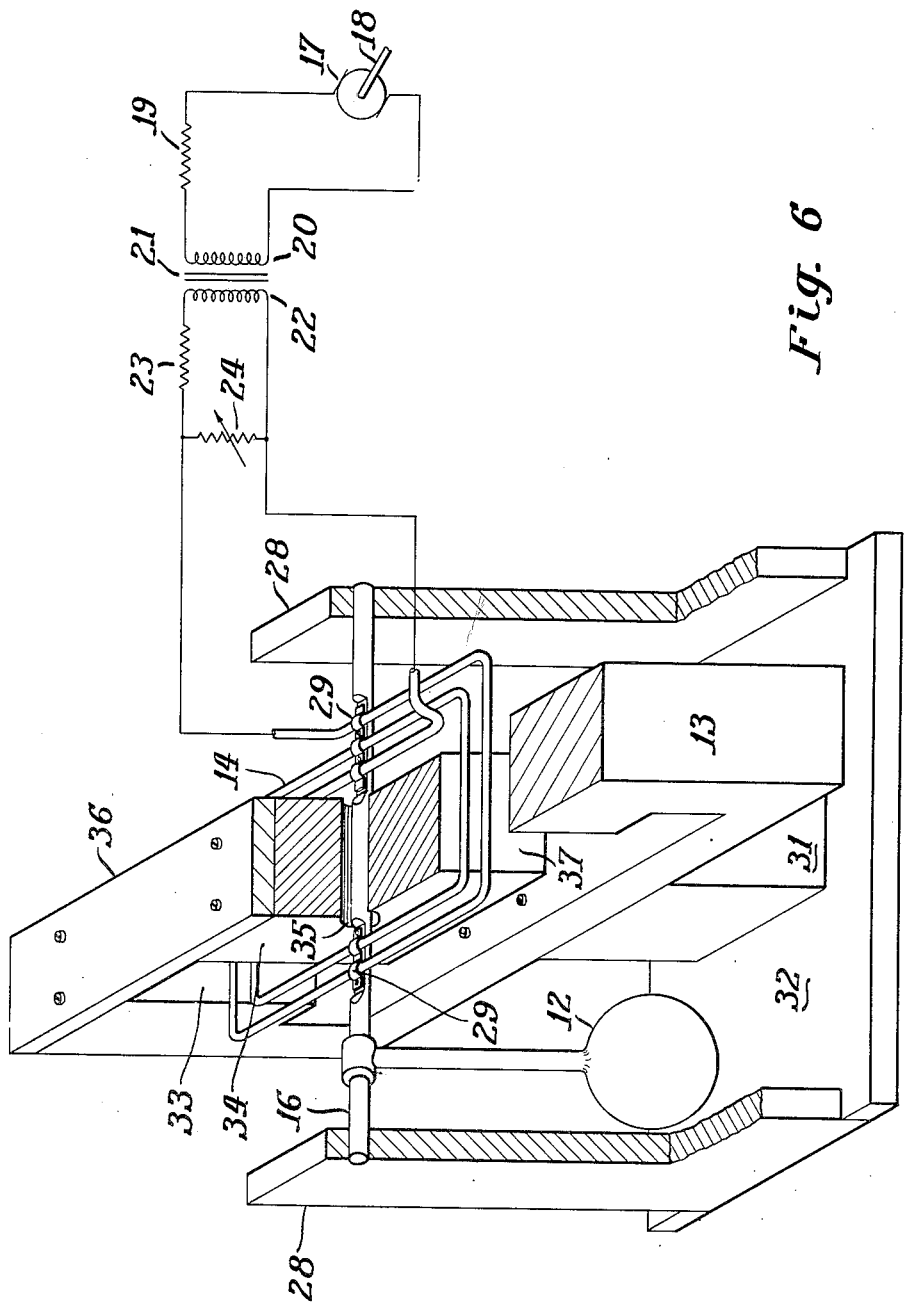
Figure 6 shows an oblique view of one form of apparatus which is adapted to carry out this invention.
Figure 7:
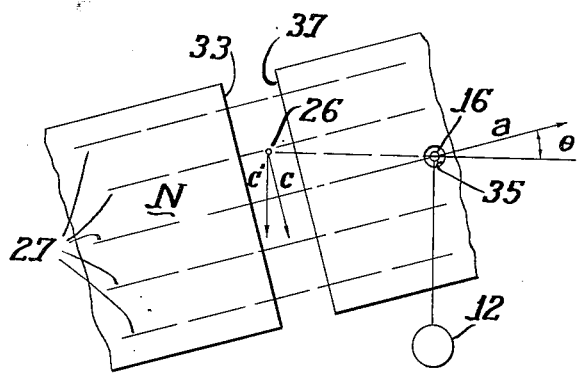
Figure 7 is a diagrammatic representation of the flux path in the apparatus shown in Figure 6 together with a diagram of the forces acting upon the pendulum when the vehicle carrying the elevation meter is accelerated upon an inclined path.
Figure 8:
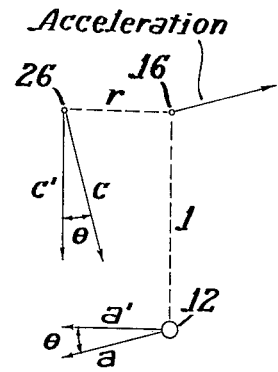
Figure 8 shows a resolution of all the forces acting upon the pendulum involved in the apparatus of Figure 6 in the position and under the conditions shown in Figure 7.
Figure 9:
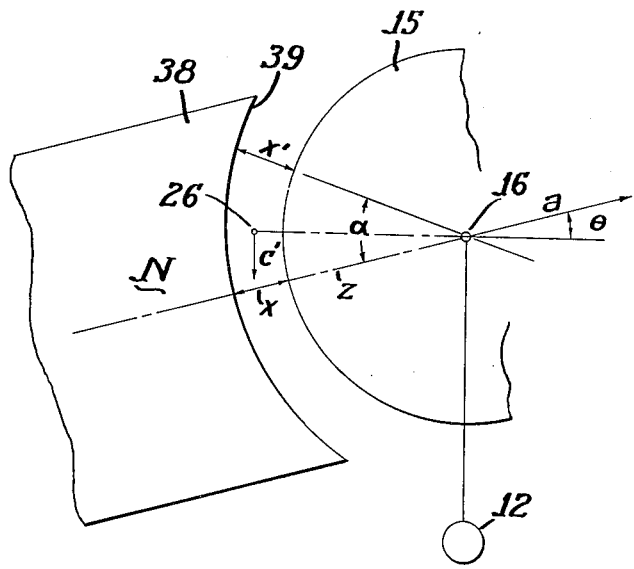
Figure 9 is a schematic representation of an alternative embodiment of my invention showing the flux path together with a diagram of the forces acting on the pendulum when the vehicle carrying the elevation meter is accelerated upon an inclined path.

In Figures 6 and 9 I have shown alternative means for overcoming this error and producing a compensating torque on the pendulum which varies directly as the torque produced by the acceleration, i. e., directly as the cosine of the angle of slope. In Figure 6 a pendulum 12 is shown mounted on axis 16 rotatably suspended from supports 28. Compensator coil 14 is rigidly affixed to axis 16 by clamps 29, the ends of the coil coming out to the transformer 21 as described above. Permanent magnet 13 is connected by support 31 to the base 32. Supports 28 are likewise connected to this base 32. Permanent magnet 13 in this case has plane pole piece faces 33 for reasons hereinafter set out. A ferromagnetic block 34 having a hole 35 therethrough to accommodate the axis 16 is supported within the compensator coil 14 by a non-magnetic member 36. This ferromagnetic block, like permanent magnet 13, has plane pole faces 37. Thus the coil 14 rotates between plane and parallel pole piece faces. Inasmuch as these pole piece faces are plane and parallel, the magnetic flux therebetween is substantially parallel and of uniform density. The advantage of this type of construction may be shown by reference to Figures 7 and 8. In Figure 7 the flux lines 27 in the apparatus shown in Figure 6 are shown for the case where the vehicle is on a path inclined at an angle $\theta$ to the horizontal. Inasmuch as these pole faces are parallel planes, the flux lines are straight and of uniform density. Under this condition the force $c$ acting upon turn 26, like that of the illustration given in Figures 2 and 4, is perpendicular to the flux lines 27 and, assuming the current flow the same, is quantitatively the same. In this case, however, the effective force $$c' = c \cos \theta \tag{3}$$

where $c'$ is the tangential force acting on coil 14. For a condition of equilibrium $$c'r = a'l \tag{4}$$

From Equations 2, 3, and 4

$$c \cos \theta r = a \cos \theta l$$

From which $$cr = al \tag{1}$$

Thus in the embodiment shown in Figure 6 the compensating torque on the pendulum is equal to the accelerating torque for any slope angle $\theta$.

An alternative embodiment which produces the same result is shown in Figure 9. To represent the features of this invention the case where the vehicle is accelerated on a path which is at an angle $\theta$ with respect to the horizontal is again represented. Armature 15 again is cylindrical as illustrated in Figure 1. In this case, however, the face of pole piece 38 is neither plane nor radial. It is, however, symmetrical about the plane of the mean effective turn 26 of coil 14 when the pendulum is at an intermediate position; i. e., when the vehicle is traveling on a level path. Furthermore, the pole piece faces are shaped so that the flux density in the zone between the pole piece 38 and the armature 15 is substantially greater at the pole axis $z$ than near the pole edges 39. Under these circumstances the flux density being greater on the axis $z$, mean effective turn 26 when adjacent this axis develops a greater force than when it is in the region near the edges 39 of the pole pieces. I have found that the spacing $x$ between pole piece 38 and armature 15 should vary substantially inversely as the cosine of the angle $\alpha$. Explained mathematically, $$X' = \frac{X}{\cos \alpha}$$

where $x$ is the spacing on the axis $z$ and $x'$ is the spacing at any angle $\alpha$. In some cases, however, I have found it desirable to develop the shape of pole piece 38 by experiment so that the torque developed by compensator coil 14 will be substantially proportional to the cosine of the angle of slope of the path over which the vehicle is traveling.

It will be apparent from the above that other methods of producing the restoring or compensating torque on the pendulum which is substantially proportional to the cosine of the angle of slope of the path over which the vehicle carrying the surveying instrument is traveling will occur to those skilled in the art. For example, the same results may be accomplished by varying the flux as by use of an electromagnet with variable excitation instead of a permanent magnet or by varying the current in compensator coil 14 by adjustment of variable resistor 24 or by some combination of the above-described examples. Therefore this invention is not to be defined or limited by the above-described embodiments but only by the appended claims.

I claim:

1. A surveying apparatus which is adapted to be carried on a vehicle comprising a pendulum rotatably mounted on a substantially horizontal axis which is substantially transverse to the direction of motion of said vehicle, a generator of electric current which is adapted to produce a current proportional to the time derivative of the velocity of said vehicle, a torque compensator including a permanent magnet attached to said vehicle and having plane-faced pole pieces, a coil connected with said generator and rotatably associated with said pendulum and having at least a portion which rotates within the magnetic field of said permanent magnet whereby a restoring torque is produced on said pendulum which is substantially proportional to the cosine of the angle of slope of the path over which said vehicle travels.

2. A surveying apparatus which is adapted to be carried on a vehicle comprising a pendulum rotatably mounted on a substantially horizontal axis which is substantially transverse to the direction of motion of said vehicle, a generator of electric current which is adapted to produce a current proportional to the time derivative of the velocity of said vehicle, a torque compensator including a permanent magnet attached to said vehicle and having a coil wound on a cylindrical iron core connected with said generator and rotatably associated with said pendulum and having at least a portion which rotates within the magnetic field of said permanent magnet, a pole piece on said permanent magnet having a curved face which is substantially symmetrical about a transverse plane, the spacing between said face and said core varying substantially inversely as the cosine of the angle the plane of said coil makes with said transverse plane whereby a restoring torque is produced on said pendulum which is substantially proportional to the cosine of the angle of slope of the path over which said vehicle travels.

3. In a surveying apparatus adapted to be carried on a vehicle including a pendulum rotatably mounted on a substantially horizontal axis, said axis being substantially transverse to the direction of motion of said vehicle, means to produce an electric current directly proportional to the acceleration of said vehicle, and an acceleration compensator including two elements, one of which is a magnet structure defining two gaps in which means magnetic field passes through said axis and the other of which is a coil with two opposite sides thereof disposed in said gaps, one of said two elements being fixed to said vehicle and the other of said two elements being fixed to said pendulum and adapted to rotate therewith, said coil being connected to said means, the improvement comprising pole piece faces on said magnet adjacent said gaps having surfaces generated by a line moving parallel to the said axis, the distance of said line from said axis being variable and symmetrical with respect to said mean magnetic field in said gaps, the torque at constant current exerted by said two elements upon said pendulum being substantially directly proportional to the cosine of the angle of inclination of said vehicle relative to the horizontal.

4. A surveying apparatus which is adapted to be carried on a vehicle comprising a pendulum rotatably mounted on a substantially horizontal axis, said axis being substantially transverse to the direction of motion of said vehicle, means to produce an electric current proportional to the time derivative of the velocity of said vehicle, an acceleration compensator including two elements, one of which is a magnet and the other of which is a coil, one of said two elements being fixed to said vehicle and the other of said two elements being adapted to rotate with said pendulum, said coil being connected to said means and disposed in the magnetic field of said magnet with said coil in the plane of the mean magnetic field of said magnet when said vehicle is on a level path, the pole piece faces of said magnet being plane and disposed perpendicular to said means magnetic field of said magnet, whereby the reaction of said coil in said magnetic field will substantially compensate over a wide range of vehicle path slopes for the tendency of said pendulum to be displaced from the vertical due to the acceleration of said vehicle.

5. A surveying apparatus which is adapted to be carried on a vehicle comprising a pendulum rotatably mounted on a substantially horizontal axis, said axis being substantially transverse to the direction of motion of said vehicle, means to produce an electric current proportional to the time derivative of the velocity of said vehicle, and an acceleration compensator including two elements, one of which is a magnetic structure defining a gap and the other of which is a coil, one of said two elements being fixed to said vehicle and the other of said two elements being adapted to rotate with said pendulum, said coil being connected to said means and disposed in said gap in said magnetic structure with said coil and the axis of rotation of said coil in the plane of the mean magnetic field of said magnet when said vehicle is on a level path, the pole piece faces of said magnet being shaped into surfaces generated by a line moving parallel to said axis of rotation of said coil, the length of said gap being symmetrical about the plane of the mean effective turn of said coil when said vehicle is traveling on a level path and said length of said gap varying substantially inversely as the cosine of the angle between the mean magnetic field of said magnet and the plane of said coil, whereby a restoring torque is produced on said pendulum which will substantially compensate over a wide range of vehicle path slopes for the tendency of said pendulum to be displaced from the vertical due to the acceleration of said vehicle.

RAYMOND T. CLOUD.

REFERENCES CITED

The following references are of record in the file of this patent:

UNITED STATES PATENTS

| Number | Name | Date |
|---|---|---|
| 1,542,809 | Alexander et al. | June 23, 1925 |
| 1,804,330 | Fans | May 5, 1931 |
| 2,066,942 | Massa, Jr. | Jan. 5, 1937 |
| 2,221,643 | Lederer | Nov. 12, 1940 |
| 2,279,053 | Modlinger | Apr. 7, 1942 |
| 2,320,290 | McNatt | May 25, 1943 |
| 2,362,616 | Cloud | Nov. 14, 1944 |